(12) United States Patent
Czerwinski et al.

(10) Patent No.: US 7,624,354 B2
(45) Date of Patent: Nov. 24, 2009

(54) EFFICIENT WORKSPACE MANAGEMENT USING CONTENT GROUPS

(75) Inventors: Mary P Czerwinski, Woodinville, WA (US); Dugald R Hutchings, II, Atlanta, GA (US); Daniel C Robbins, Seattle, WA (US); George G Robertson, Seattle, WA (US); Brian R Meyers, Issaquah, WA (US); Gregory R Smith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 11/119,395

(22) Filed: Apr. 29, 2005

(65) Prior Publication Data

US 2006/0248469 A1 Nov. 2, 2006

(51) Int. Cl.
*G06F 3/048* (2006.01)
*G09G 5/00* (2006.01)

(52) U.S. Cl. .............. 715/792; 715/761; 715/804; 345/1.3; 345/172

(58) Field of Classification Search ........... 715/761, 715/764, 765, 767, 792, 804, 847; 345/1.3, 345/172
See application file for complete search history.

(56) References Cited

U.S. PATENT DOCUMENTS

| 5,533,183 | A | * | 7/1996 | Henderson et al. | 715/854 |
| 6,731,316 | B2 | * | 5/2004 | Herigstad et al. | 715/864 |
| 7,317,449 | B2 | * | 1/2008 | Robbins et al. | 345/169 |
| 2003/0020671 | A1 | * | 1/2003 | Santoro et al. | 345/1.3 |

OTHER PUBLICATIONS

Rooms: The use of multiple virtual workspaces to reduce space contention in a window-based graphical user interface by D. Austin Henderson, Jr., and Stuart K. Card p. 211-243.*
Czerwinski, M., et al., "Toward Characterizing the Productivity Benefits of Very Large Displays," *Proceedings of INTERACT '03: IFIP TC13 International Conference on Human-Computer Interaction*, Zurich, Sep. 1-5, 2003, pp. 9-16.
Grudin, J., "Partitioning Digital Worlds: Focal and Peripheral Awareness in Multiple Monitor Use," *Proceedings of the SIGCHI '01 Conference on Human Factors in Computing Systems*, ACM, Seattle, Washington, Mar. 31-Apr. 4, 2001, pp. 458-465.
Henderson, D.A., Jr., and S.K. Card, "Rooms: the Use of Multiple Virtual Workspaces to Reduce Space Contention in a Window-Based Graphical User Interface," *ACM Transactions on Graphics* 5(3):211-243, Jul. 1986.

(Continued)

*Primary Examiner*—Kieu Vu
*Assistant Examiner*—Haoshian Shih
(74) *Attorney, Agent, or Firm*—Lee & Hayes, PLLC

(57) ABSTRACT

A system and method for efficiently managing desktop content is presented. A plurality of content groups are defined on a computer system. Upon activating the content management system on the computer, representative views are displayed on an associated display device. Each representative view corresponds to a defined content group, and also corresponds to a key on an input device. The system obtains a management action to be completed on the displayed content and further obtains a keypress corresponding to one of the representative views (and its corresponding content group.) The system identifies the content group corresponding to the keypress and carries out the management action on the display content of that content group.

15 Claims, 18 Drawing Sheets

OTHER PUBLICATIONS

Hutchings, D.R., et al., "Display Space Usage and Window Management Operation Comparisons Between Single Monitor and Multiple Monitor Users," *Proceedings of the Working Conference on Advanced Visual Interfaces 2004*, ACM, Gallipoli, Italy, May 25-28, 2004, pp. 32-39.

Hutchings, D.R., and J. Stasko, "Revisiting Display Space Management: Understanding Current Practice to Inform Next-Generation Design," *Proceedings of Graphics Interface 2004*, Canadian Human-Computer Communications Society, London, Canada, May 17-19, 2004, pp. 127-134.

Ringel, M., "When One Isn't Enough: an Analysis of Virtual Desktop Usage Strategies and Their Implications for Design," *Conference on Human Factors in Computing Systems CHI 2003*, ACM, Ft. Lauderdale, Florida, Apr. 5-10, 2003, pp. 762-763.

Robbins, D.C., et al., "Zonezoom: Map Navigation for Smartphones With Recursive View Segmentation," *Proceedings of the Working Conference on Advanced Visual Interfaces*, ACM, Gallipoli, Italy, May 25-28, 2004, pp. 231-234.

Tan, D.S., and M. Czerwinski, "Effects of Visual Separation and Physical Discontinuities When Distributing Information Across Multiple Displays," *Proceedings of OZCHI '03*, Australian Computer-Human Interaction Conference, University of Queensland, Brisbane, Australia, Nov. 26-28, 2003, pp. 184-191.

* cited by examiner

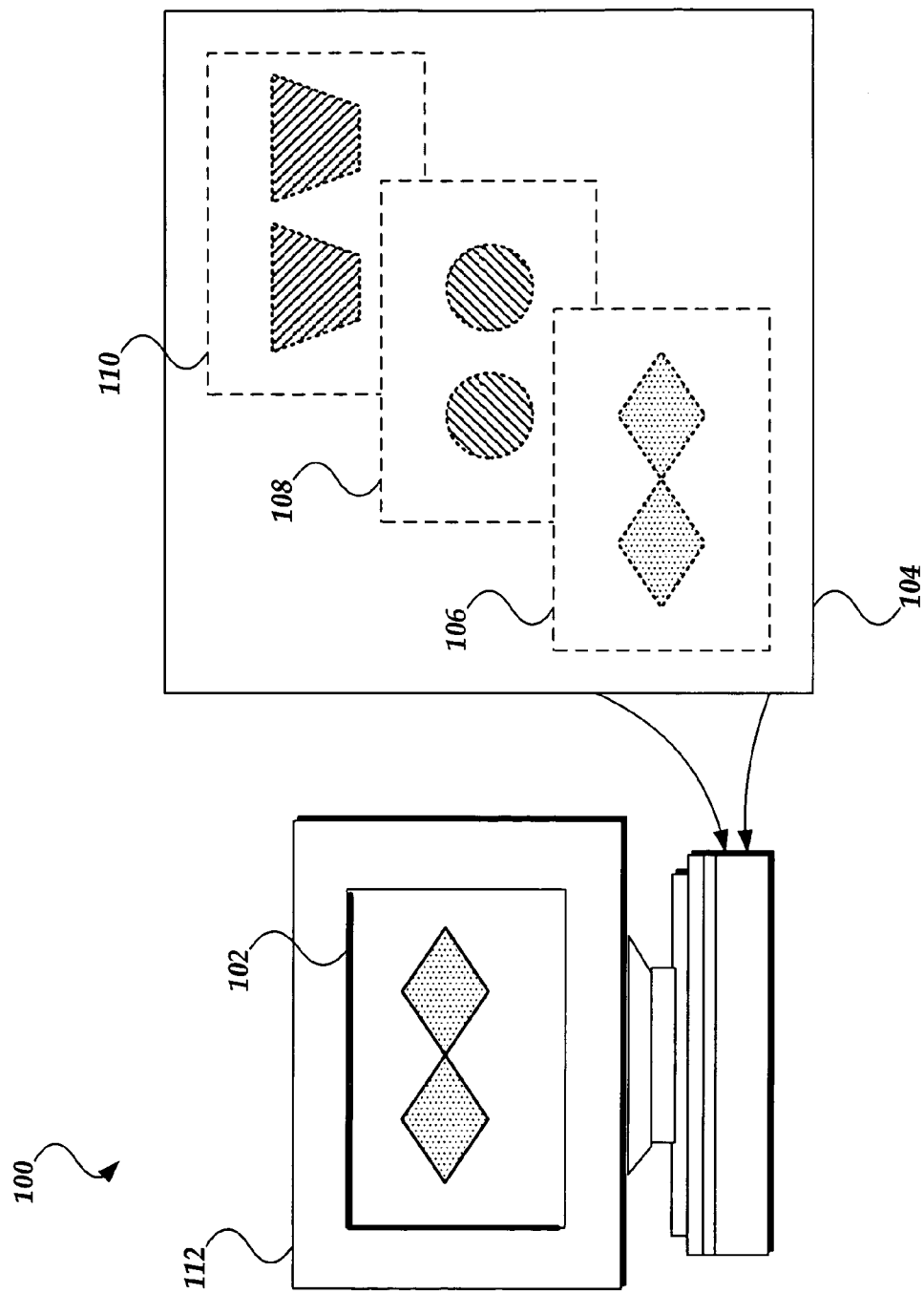

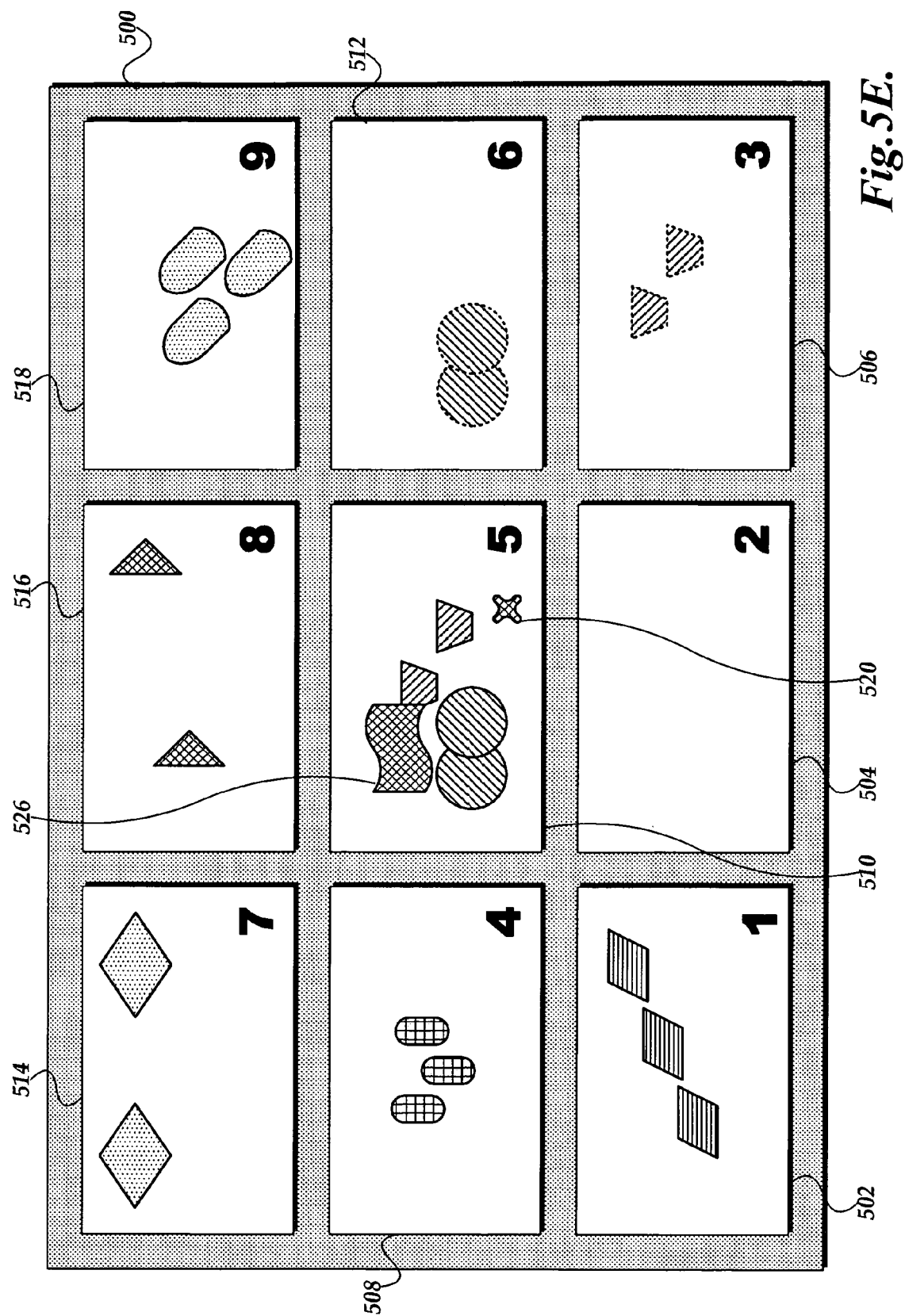

EFFICIENT WORKSPACE MANAGEMENT USING CONTENT GROUPS

FIELD OF THE INVENTION

The present invention relates to computers and how a computer user interfaces with the computer, and more particularly, to efficient workspace management using content groups on a computer system.

BACKGROUND OF THE INVENTION

Many computer users find the display area of their computer system to be insufficient for their needs. More particularly, computer users frequently find that they desire more display area than a computer's display device physically affords. In these circumstances, a computer user typically turns to one of several options. First, the computer user may add one or more additional display devices, i.e., display monitors (or just monitors), thereby creating a multi-monitor computer system with the added display area of each added monitor. Second, a computer user may simply purchase a larger monitor, i.e., one with more display area and/or higher resolution. Third, rather than purchase monitors, a computer user may employ a system feature frequently referred to as a virtual desktop.

The displayed contents on a physical display area are almost universally first "rendered" in computer memory, and more particularly, memory typically devoted to a graphics display subsystem. After the contents are rendered into computer memory, the graphics display subsystem transfers the rendered information to the physical display device, i.e., the monitor.

Virtual desktops build upon the foundation that content is rendered to memory and subsequently transferred by the graphics display subsystem to a monitor. The general concept behind virtual desktops is that of creating multiple display areas in the graphics display memory. The graphics display subsystem is also configured to transfer, at any one time, one of the virtual desktops to the monitor. FIG. 1 is a pictorial diagram illustrating an exemplary computer system 100 with a display area 102 on the attached monitor 112, and including a plurality of virtual desktops 106-110 rendered in memory 104. As illustrated in FIG. 1, the computer's graphics display subsystem (not shown), configured to display one of a plurality of virtual desktops, is currently displaying virtual desktop 106 on the computer monitor's display area 102.

Computer systems, such as computer system 100, whose graphics display subsystem offers virtual desktop capabilities, also provide some mechanism to permit a computer user to change which virtual desktop is displayed on the display area 102. Typically, a user can cycle through defined virtual desktops until a desired virtual desktop is displayed in the display area 102. For example, pressing a predetermined combination of keys on a keyboard will cause the system to display the next virtual desktop according to an internal z-ordering of the defined virtual desktops.

Those familiar with the concept of virtual desktops will appreciate that locating content on a specific virtual desktop, especially on one that is not currently displayed on the monitor 112, can be quite challenging. Typically, when a plurality of virtual desktops are created on a computer system 100, the first virtual desktop, such as virtual desktop 106, includes all of the display content that was present on the display system prior to creating the virtual desktops, and the additional virtual desktops, such as virtual desktops 108 and 110, are usually empty. In order for a computer user to place content onto a virtual desktop, the computer user must perform some rather cumbersome procedures. FIGS. 2A-2C are pictorial diagrams of two virtual desktop areas, useful to illustrate a typical procedure by which a computer user moves content from a first virtual desktop 202 to a second virtual desktop 204.

In order to illustrate the exemplary, typical procedure with regard to FIGS. 2A-2C, assume that content 206 is currently located on virtual desktop 202, and that virtual desktop 202 is currently displayed on the computer's monitor 112. Virtual desktop 204 is not displayed on the computer's monitor, as indicated by the dashed lines.

As shown in FIG. 2A, in order to move content 206 from the virtual desktop 202 to the virtual desktop 204, the computer user typically selects and moves the content 206 (usually by a drag operation via a mouse or other input device) towards a border of the virtual desktop 202 with prior knowledge that another virtual desktop, i.e., virtual desktop 204, is in that direction.

With reference now to FIG. 2B, not only must the computer user move the content 206 to the border of the virtual desktop 202, the user must move the content beyond the border, such that a portion of the content cannot be rendered on the virtual desktop 202. In fact, while the computer user cannot see it, the computer user knows that in moving some portion of the content 206 past the border of the currently displayed virtual desktop 202, the portion of the content that is no longer displayable on the currently displayed virtual desktop 202 is rendered onto non-displayed virtual desktop 204, as indicated by arrow 208.

Once a portion of the content 206 is rendered onto a non-displayed virtual desktop 204, the computer user can then switch, or cycle, to the second virtual desktop 204. With the second virtual desktop 204 displayed on the computer's monitor, as indicated in FIG. 2C, the computer user now has at least a portion of the content 206 on the desired virtual desktop 204, and is free to reposition that content 206 fully onto the virtual desktop 204 if desired.

Of course, while the above-described manner for moving content from a first virtual desktop 202 to a second virtual desktop 202 is cumbersome, when there are more than two virtual desktops this process becomes more difficult. Clearly, there needs to be an improved mechanism for moving content among virtual desktops.

Many computer systems include a keyboard as an input device. FIG. 3 is a pictorial diagram illustrating an exemplary keyboard. As illustrated in FIG. 3, in addition to the standard "QWERTY" arrangement of alpha-numeric keys, most modem keyboards include a so-called 10-key keypad 302. Additionally, most keyboards also include modifier keys 304 and function keys 306. The modifier keys 304 are typically keys that must be used in combination with another key, and generally are considered to modify the meaning of that other key. The "Shift", "Control", and "Alternate" keys are some examples of modifier keys, which when pressed in combination with another key, modify the meaning of the other key. Alternatively, function keys 306 typically cause an action to occur, or have some special meaning themselves. As such, function keys 306 are not typically used to modify other keys, though one or more modifier keys 304 may be used to modify the function of a function key.

One aspect of keyboards as input devices to a computer system is that a great deal of efficiency can be realized by keyboard users. Much of the efficiency is gained as keyboard input becomes autonomic, i.e., where input entry, or typing, becomes a matter of so-called "muscle memory."

In light of the cumbersome manner in which computer users currently use virtual desktops, and in further light of the efficiencies that can be gained through muscle memory actions with regard to keyboards, what is needed is an efficient manner in which a user can manage content across a plurality of virtual desktops on a computer system. The present invention addresses this and other issues found in the prior art.

SUMMARY OF THE INVENTION

According to aspects of the present invention, a display management system for efficiently managing displayable content on a computer system is presented. The computer system includes a display device, a memory, a graphics display system, and an input device having a plurality of keys for inputting data to the computer system. The display management system is configured such that a plurality of content groups are defined. A content group is a grouping of content that can be displayed on the display device via the graphics display system. Upon detecting a display management trigger event, the display management system displays a plurality of representative views on the display device. Each representative view corresponds to one of the defined content groups, and each representative view is associated with a key on the input device. A display management action event is obtained, identifying a management action to be taken by the content management system. A keypress input from the input device is obtained. A content group corresponding to the keypress input is identified by identifying the representative view associated with the key of the keypress input, and identifying the content group corresponding to the identified representative view. The display management system then carries out the identified management action on the identified content group.

According to additional aspects of the present invention, a computer-readable medium bearing computer-executable instructions is presented. When executed on a computer including a display device, a graphics display system, a memory, and an input device having a plurality of keys for inputting data to the computer, the instructions carry out a method for managing display content on the computer. The method comprises defining a plurality of content groups, where a content group is a grouping of content that can be displayed on the display device via the graphics display system. Upon detecting a display management trigger event, a plurality of representative views are displayed on the display device. Each representative view corresponds to one of the defined content groups, and each representative view is associated with a key on the input device. A display management action event identifying a management action to be taken by the content management system is obtained. A keypress input from the input device is obtained. A content group corresponding to the keypress input is identified by identifying the representative view associated with the key of the keypress input, and identifying the content group corresponding to the identified representative view. The identified management action is implemented on the identified content group.

According to still further aspects of the present invention, a computer system for efficiently managing the display of content to a computer user is presented. The computer system comprises a display device for displaying content to the computer user and an input device having a plurality of keys for inputting data to the computer system. The computer system further comprises a memory storing a plurality of content groups defined on the computer system, each content group comprising a group of displayable content, and a graphics display system configured to render displayable content onto the display device. The computer system is configured to detect a content management event, and upon detecting the content management event, displays a plurality of representative views in a grid arrangement. Each representative view corresponds to a defined content group, and each representative view also corresponds to one of the keys on the input device. Additionally, each representative view displays the value/key to which it corresponds. The grid arrangement corresponds to the arrangement of keys on the input device. A management action event identifying a content group management action to be taken by the computer system is obtained. A key input from the input device that identifies a content group upon which the content group management action is to be taken is also obtained. The content group management action is then carried out on the identified content group.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a pictorial diagram illustrating an exemplary computer system with a display area on the attached monitor, and including a plurality of virtual desktops rendered in memory;

FIGS. 5A-5E are pictorial diagrams illustrating an exemplary display area showing representative views of content groups on a computer system, and the results of various content group management functions;

DETAILED DESCRIPTION

Figure 9:
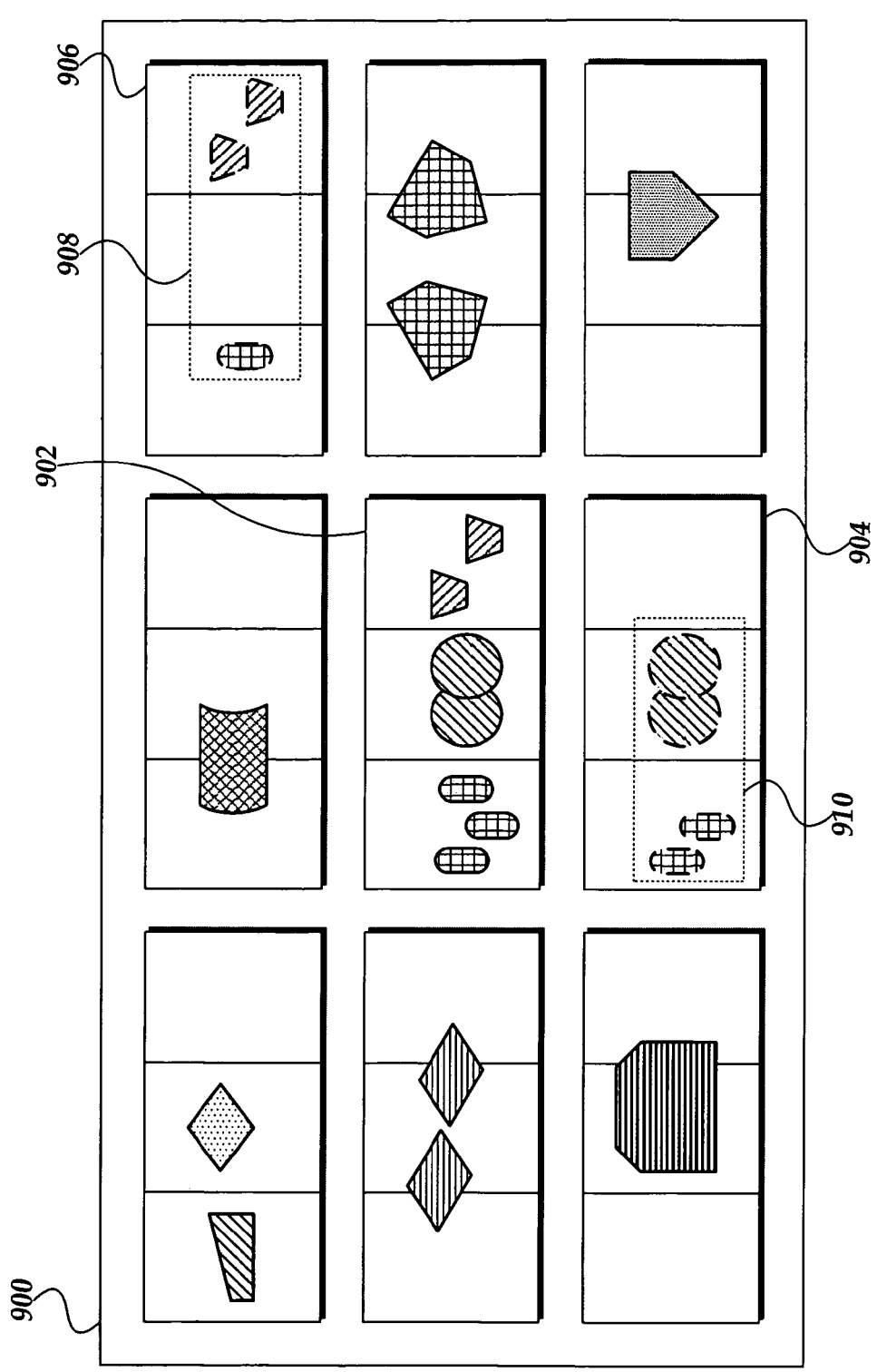
FIG. 9 is a pictorial diagram illustrating exemplary content groups where the content of all monitors in a multi-monitor computer system are viewed as a single working group.

The present invention may be implemented on a variety of computer configurations. For example, the invention may be implemented on a computer having a single monitor, such as computer 100 (FIG. 1), or alternatively, on a computer system having multiple monitors, such as computer system 900 (FIG. 9). Additionally, the exemplary invention may be practiced on a computing system that includes a remote control device, typically one with a 10-key keypad, or in conjunction with a handheld computing device, such as a personal digital assistant (PDA), wireless phone, or the like.

It should be appreciated that while the present invention includes similarities to virtual desktop systems, in order to better distinguish from virtual desktops, the present invention uses the term "content group" to identify a set of content that is displayed together on one or more display areas. As with virtual desktops, multiple content groups may be defined on a computer system, yet, in contrast to virtual desktops, any number of the defined content groups may be displayed at the same time. According to aspects of the present invention, content that is displayed in a display area 102 (FIG. 1) is either explicitly or implicitly assigned to one of the content groups defined in the system. Assigning content to a content group is discussed in greater detail below.

In order to provide efficient content group management, in a preferred embodiment, one or more keypresses from a keyboard, or other similar input device, are used to activate management of the content groups defined on the system. Function and/or modifier keys, pressed separately or in conjunction with other keys, may be used to trigger content group management. As an example, content group management may be triggered by pressing the combination of the "Alt" key and the "Enter" key. Of course, any number of keypresses or combinations of keypresses may be used to trigger content group management. Thus, the combination of the "Alt" and "Enter" keys should be viewed as illustrative only, and not limiting upon the present invention.

To facilitate the description of the present invention, the following convention is adopted to describe the pressing of one or more keys on a keyboard. More particularly, to indicate a keypress, the keypress will be denoted by angle brackets surrounding the key's identifier. For example, pressing the "Alt" key will be shown as <Alt>, and pressing the "Enter" key will be shown hereafter as <Enter>. Combinations of keys will be shown with a "+" sign between the keys. Thus <Alt>+<Enter> indicates that the "Alt" and "Enter" keys are to be pressed in combination. Additionally, the following description will frequently refer to keypresses of numbered keys, particularly those on the 10-key keypad. Unless otherwise indicated to the contrary, a generic reference to a keypress of a number will be depicted as <#>. In short, <#> indicates the keypress of any number key, whereas <3> indicates the keypress of the "3" key (either on a keypad or otherwise).

While the following description is made in regard to a singled number key/keypress identifying a particular content group, in an alternative embodiment, a series of number keys may be used to identify a content group. For example, a representative view (described below) may show that its selection is made by pressing a number twice, such as <9><9>. As a further alternative, the corresponding key value may be an alphabetic character, such as <A> or <T>. Accordingly, the following description with regard to an identifying keypress should be viewed as illustrative only, and not construed as limiting upon the present invention.

Figure 2A:
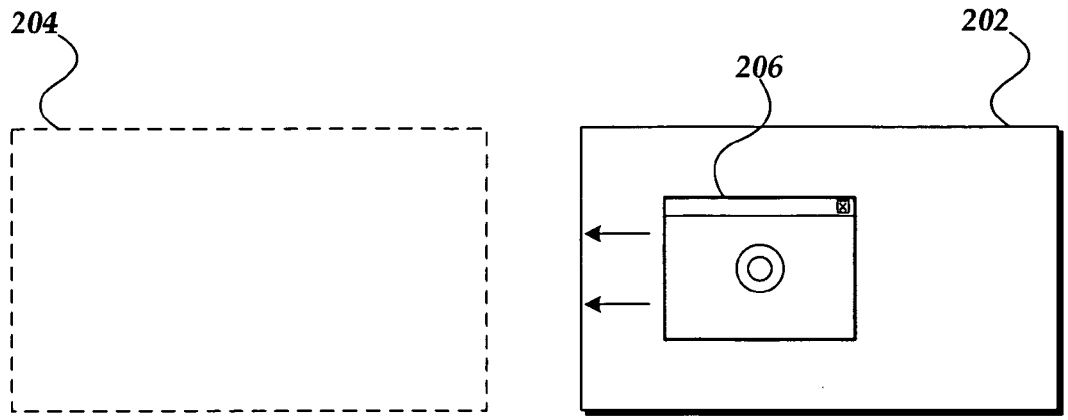
FIGS. 2A-2C are pictorial diagrams of two virtual desktop areas, useful to illustrate a typical procedure by which a computer user moves content from a first virtual desktop to a second virtual desktop.
Figure 2B:
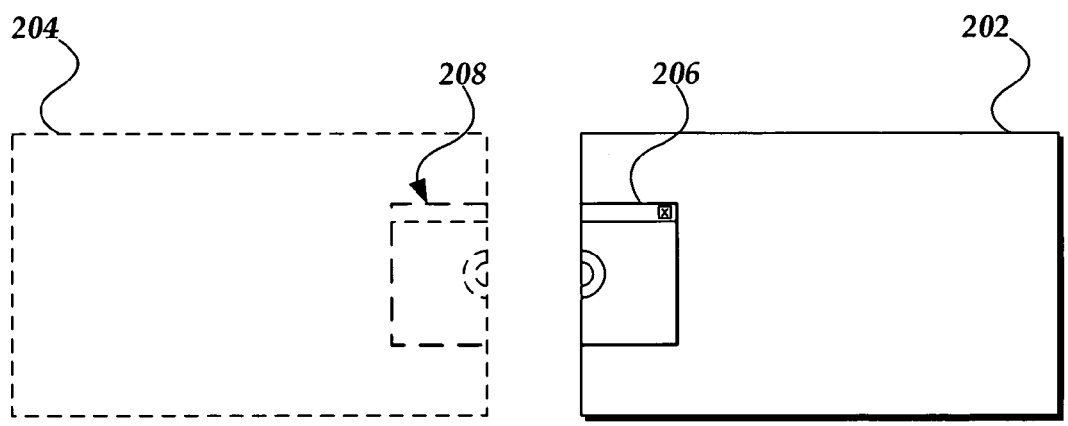
Figure 2C:
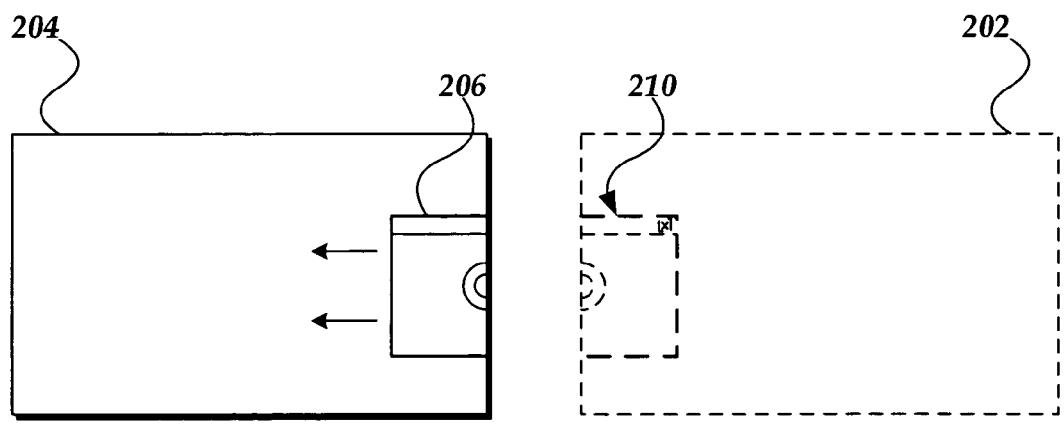
Figure 3:
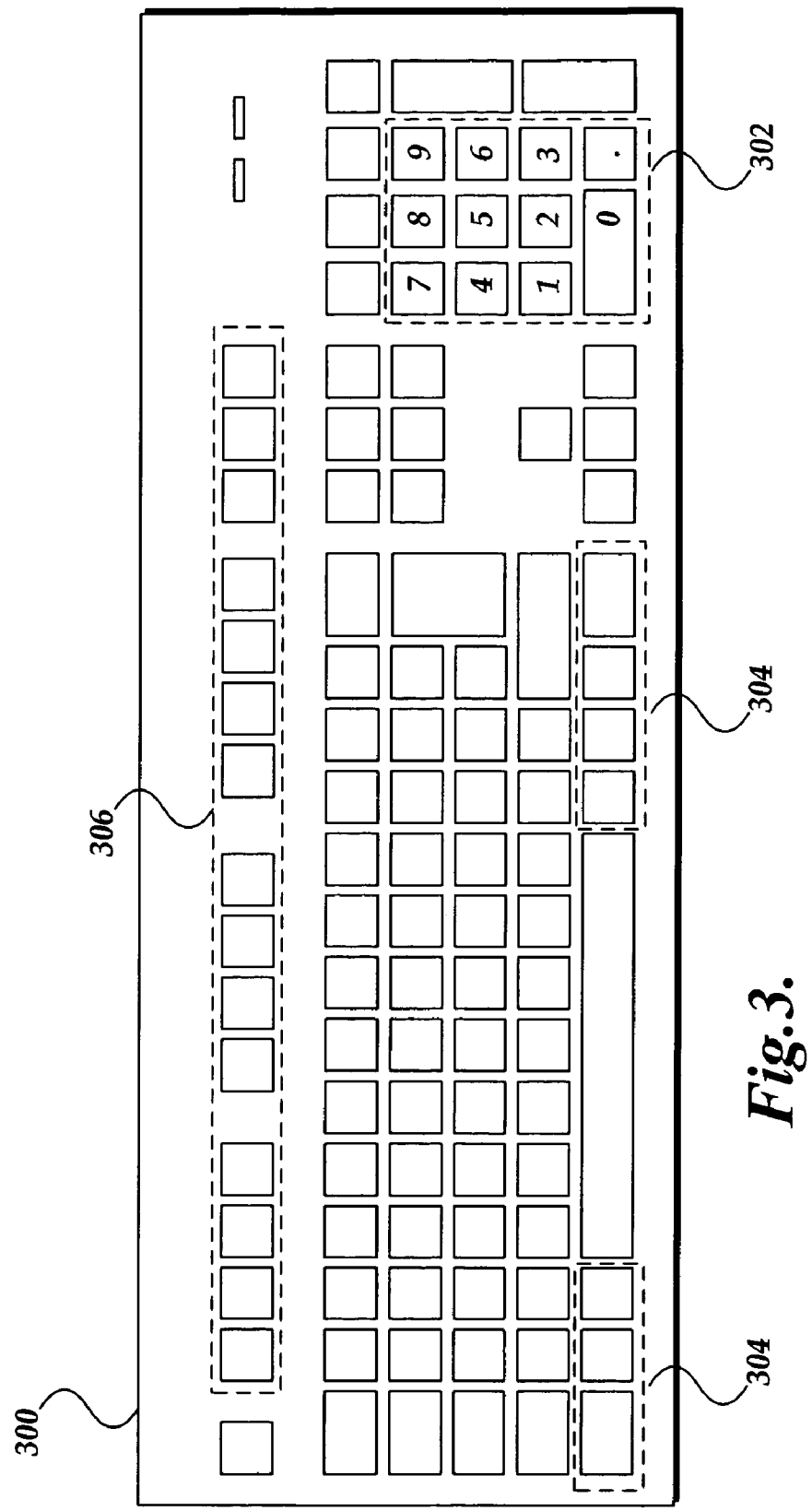
FIG. 3 is a pictorial diagram illustrating an exemplary keyboard.
Figure 4A:
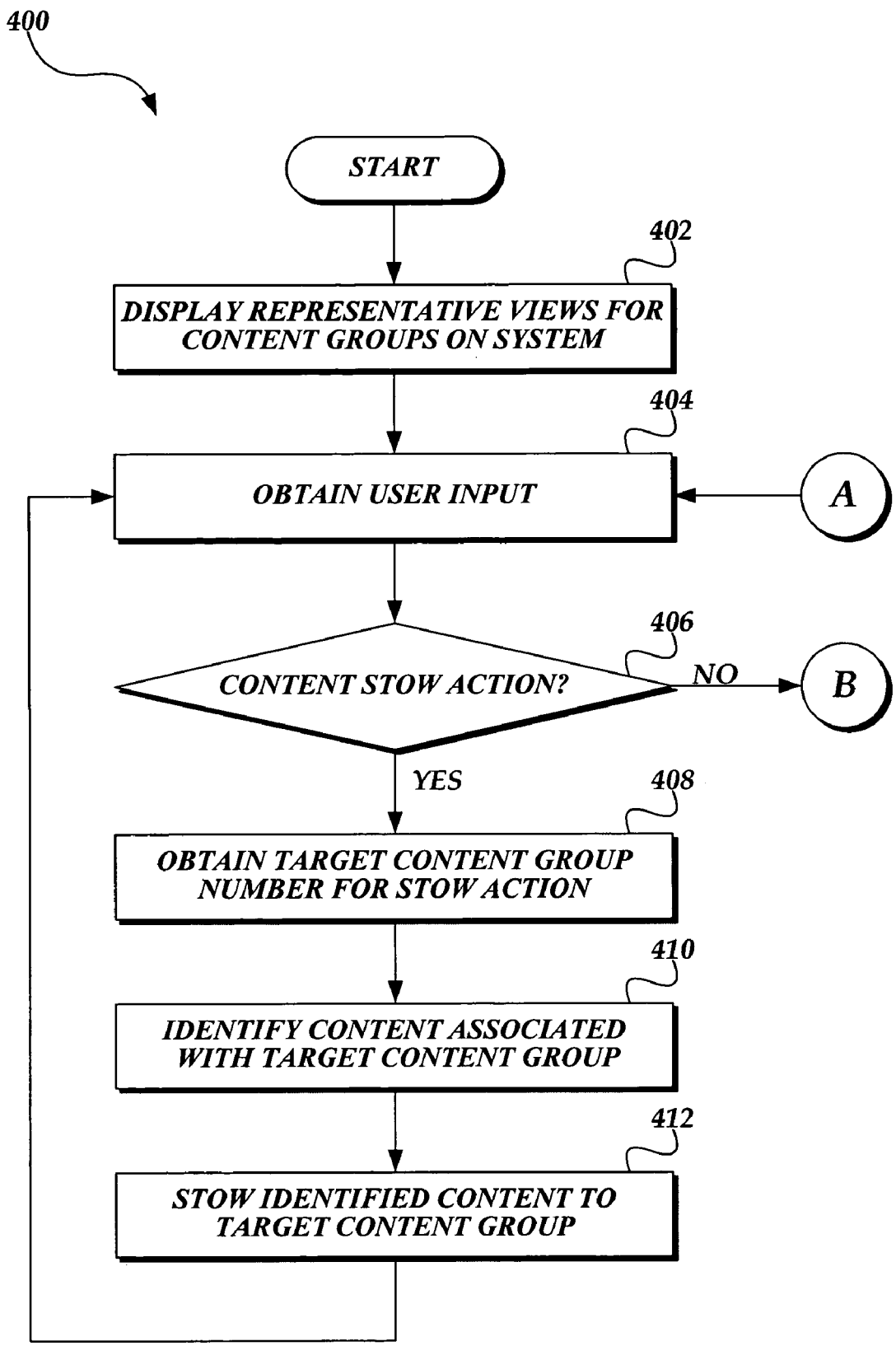
FIGS. 4A-4D illustrate a flow diagram of an exemplary content group management routine for providing content group management functions to a computer user.
Figure 4B:
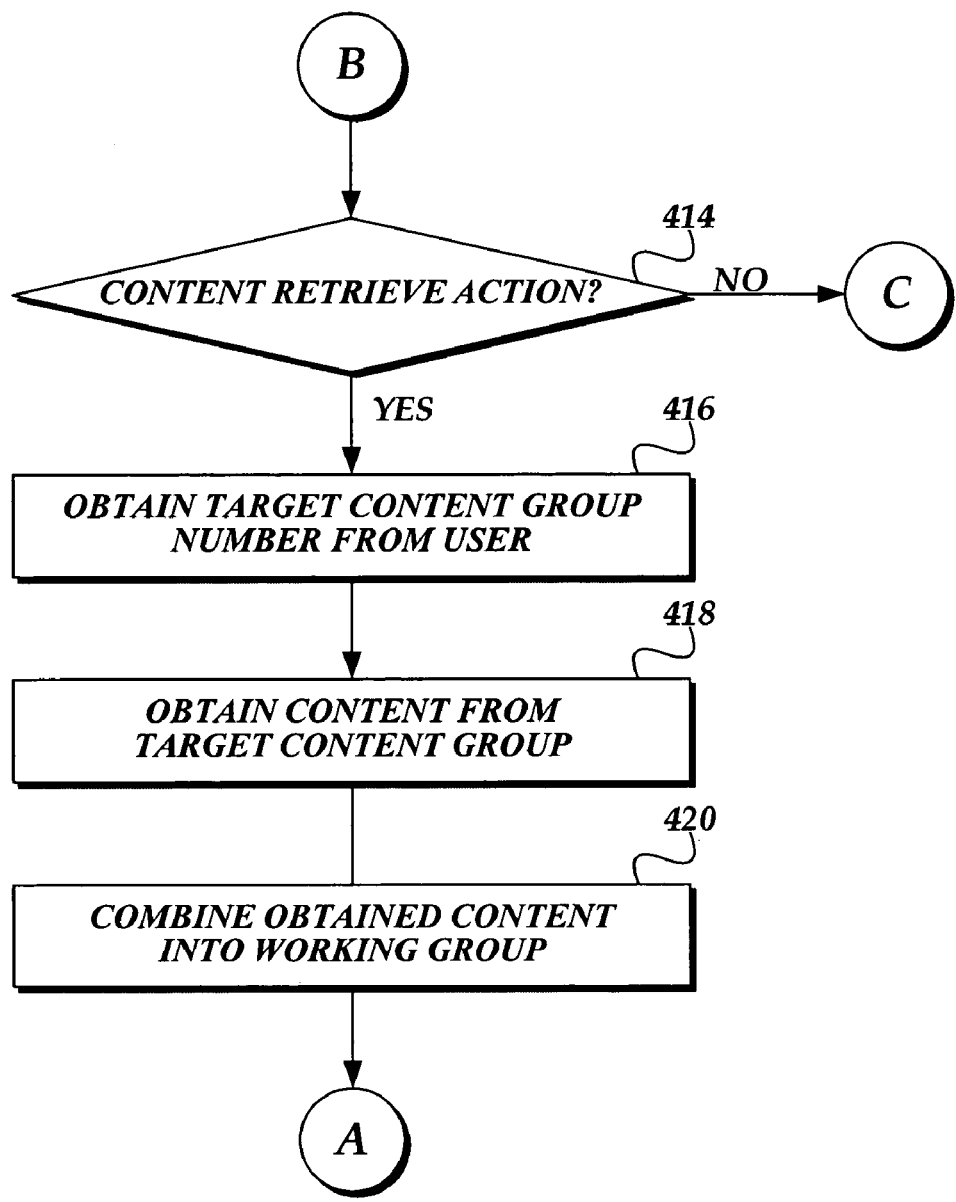
Figure 4C:
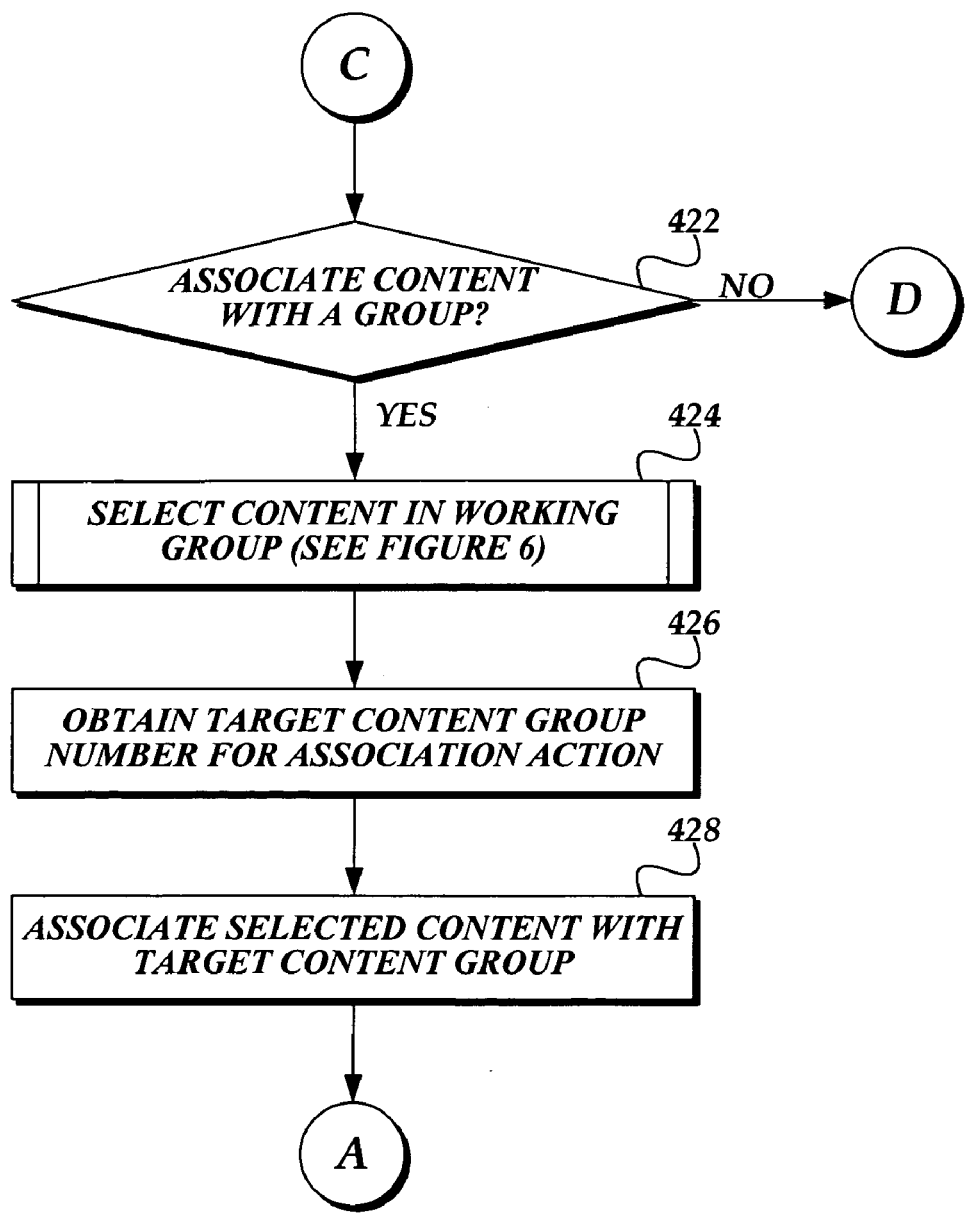

Once content group management has been triggered on a computer, the user is then able to perform a variety of content group management functions. FIGS. 4A-4C illustrate a flow diagram of an exemplary content group management routine 400 for providing content group management functionality to a computer user. It should be noted, however, that while the exemplary routine 400 may be implemented on a variety of computer configurations, except where otherwise noted, the following discussion of the exemplary routine 400 will assume a computer system configured with one monitor, such as computer 100 of FIG. 1, and a keyboard that includes a numeric keypad, such as keyboard 300 shown in FIG. 3.

Figure 5A:
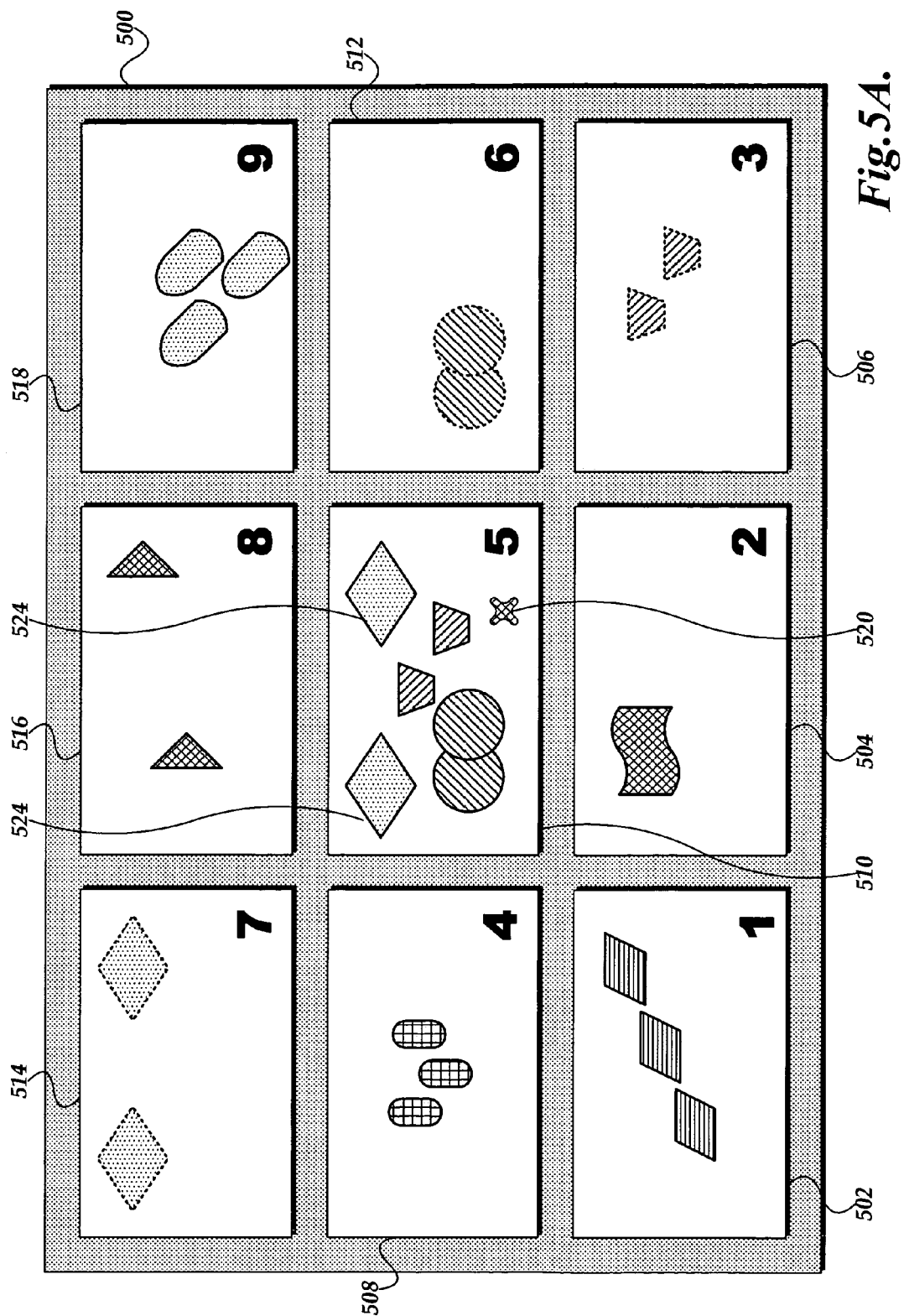

Beginning at block 402, the content groups defined on the computer system are displayed to the user in a grid layout. FIG. 5A is a pictorial diagram illustrating an exemplary grid layout 500 showing representative views of content groups defined on the system in a grid layout. The grid layout 500 of the representative views may be displayed on a single display area 102, or alternatively, across multiple monitors on a multi-monitor computer system. The present invention should not be viewed as constrained to any particular embodiment. However, the following discussion of FIGS. 5A-5E is made assuming the grid layout 500 corresponds to a single display area 102. Additionally, with regard to the representative views displayed in the grid layout, for readability and simplicity purposes, in the following description they will also be generically referred to as the actual content group. More particularly, rather than saying "the content group corresponding to representative view 514," the following discussion shortens this to "the content group 514."

As shown in FIG. 5A, according to one embodiment of the present invention, each of the representative views 502-518 that is displayed to the user is a scaled version of its corresponding content group. According to one embodiment, nine content groups are defined on the computer system and correspond, in arrangement, to numbers 1-9 on a 10-key keypad 302. Thus, as shown in FIG. 5A, each of the nine representative views includes a number corresponding to a number on a numeric keypad 302, according to the general layout of numbers 1-9 on the numeric keypad 302.

According to one embodiment of the present invention, one of the content groups defined in the system is designated as the working group. The working group represents the content group through which a computer user interacts with the contents of the various content groups. Content that has not been explicitly associated to a particular content group is, by default, assigned to the working group. Accordingly, as a computer user interacts with content through the working group, content associated with other content groups must be temporarily retrieved into the working group for the computer user to access that content. Of course, content that is associated with a content group but that is temporarily retrieved into the working group can be dismissed (stowed) back to its associated content group, thereby removing it from the working group.

While any of the content groups defined on the system could be designated as the working group, in one embodiment and as illustrated in FIG. 5A, representative view 510 is designated as the working group. As shown in FIG. 5A, the working group 510 temporarily includes content assigned to representative views 506, 512, and 514, as can be seen from the corresponding content in the respective content groups displayed with dashed borders. Currently, content 520 is not associated with any other content group other than the working group 510.

FIGS. 5A-5E illustrate that content assigned to a content group is displayed in its representative view with solid borders unless that content is temporarily retrieved into the working group, in which case it is displayed with dashed lines. However, this is just one example of how to indicate that content is temporarily retrieved into the working group. Numerous other mechanisms may be used, such as rendering the content in a grayed-out manner. Thus, displaying retrieved content in dashed lines should be viewed as illustrative only, and not construed as limiting upon the present invention.

Returning again to the exemplary routine 400 of FIG. 4A, after having displayed the representative views for the content groups to the user, the exemplary routine obtains the user's input as one or more management actions to perform on the content groups. At decision block 406, a determination is made as to whether the obtained input is an instruction to stow content temporarily retrieved into the working group back to its associated content group. If the user's input was not an instruction to stow content to its associated content group, the exemplary routine 400 proceeds to decision block 414 (FIG. 4B), described below.

If the user's input was an instruction to stow content from the working group, i.e., remove content currently in the working group to its associated content group, at block 408, the identity of a target content group associated with the stow instruction is obtained. For example, assume that the user indicates a stow action by the keypress combination of <Win>+<–>, where "Win" is one of the modifier keys 304 on the user's keyboard 300, and the "–" is found either on the numeric keypad 304 or elsewhere on the keyboard. Continuing the example, after having pressed the <Win>+<–>, the user follows the combination by entering a number that corresponds to one of the content groups, such as <7>, corresponding to content group 514. This identified content group is then the target content group for the present stow action.

At block 410, all content currently included in the working group 510 that is associated with the target content group 514 is identified. Thus, continuing the example from above, after the user identifies the target content group 514 by pressing <7>, the exemplary routine 400 would identify content 524 in the working group 510 as associated with the target content group.

Figure 5B:
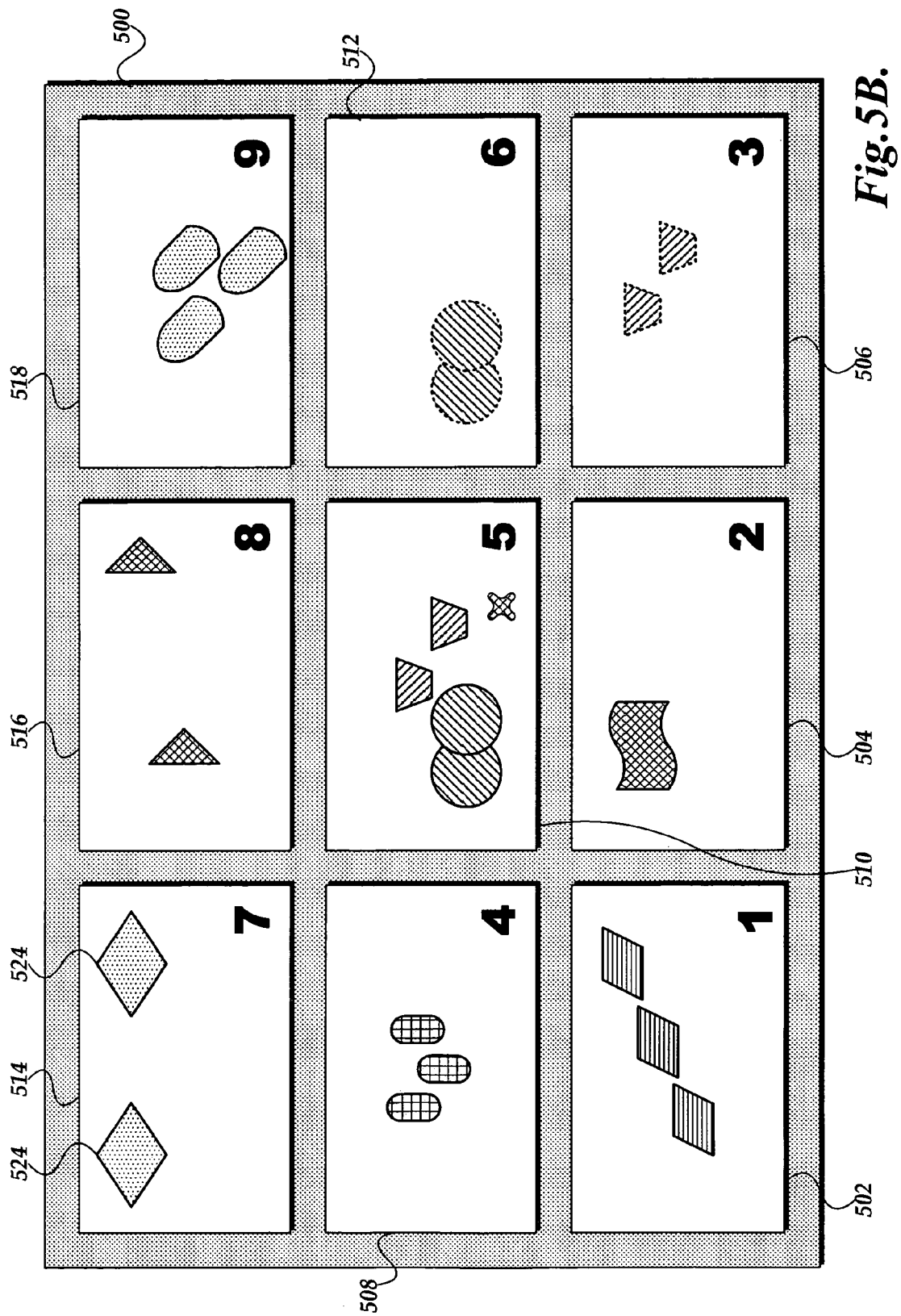

At block 412, the identified content 524 is stowed, i.e., removed from the working group 510. In addition to removing the stowed content 524 from the working group 510, the target content group, in this case content group 514, is also updated. In the present example, the corresponding content in the target content group 514 is displayed with a solid border. FIG. 5B illustrates the result of the stow action example described above, i.e., stowing/removing content 524 from the working group 510 to its associated content group 514.

With reference again to FIG. 4A, after having stowed the content associated with the target content group, the exemplary routine 400 returns again to block 404 to obtain additional user instructions. However, it should be appreciated that returning for additional user instructions is only an exemplary embodiment, and should not be construed as limiting upon the present invention. In an alternative embodiment, after having executed a user instruction, such as a stow instruction, the alternative exemplary group management routine would immediately terminate, i.e., exit the group content management function mode.

As indicated above, at decision block 406, if the user's input was not an instruction to stow content from the working group 510, the exemplary routine 400 proceeds to decision block 414 (FIG. 4B). At decision block 414, a determination is made as to whether the user's input is an instruction to retrieve content from a content group into the working group 510. If the user's input is not an instruction to retrieve content into the working group 510, the exemplary routine 400 proceeds to decision block 422 (FIG. 4C), as described below.

If, at decision block 414, the user's input is an instruction to retrieve content into the working group 510, at block 416, the identity of a target content group, i.e., a target content group from which content is to be temporarily retrieved into the working group, is obtained from the user. For example, assume that the user indicates a retrieve action by the keypress combination of <Win>+<+>, where "Win" is one of the modifier keys 304 on the user's keyboard 300, and the "+" is found either on the numeric keypad 304 or elsewhere on the keyboard. After having indicated a retrieve action, the user follows the combination by entering a number that corresponds to one of the content groups, such as <2>, thereby identifying the target content group from which its associated content is to be retrieved into the working group 510.

Figure 5C:
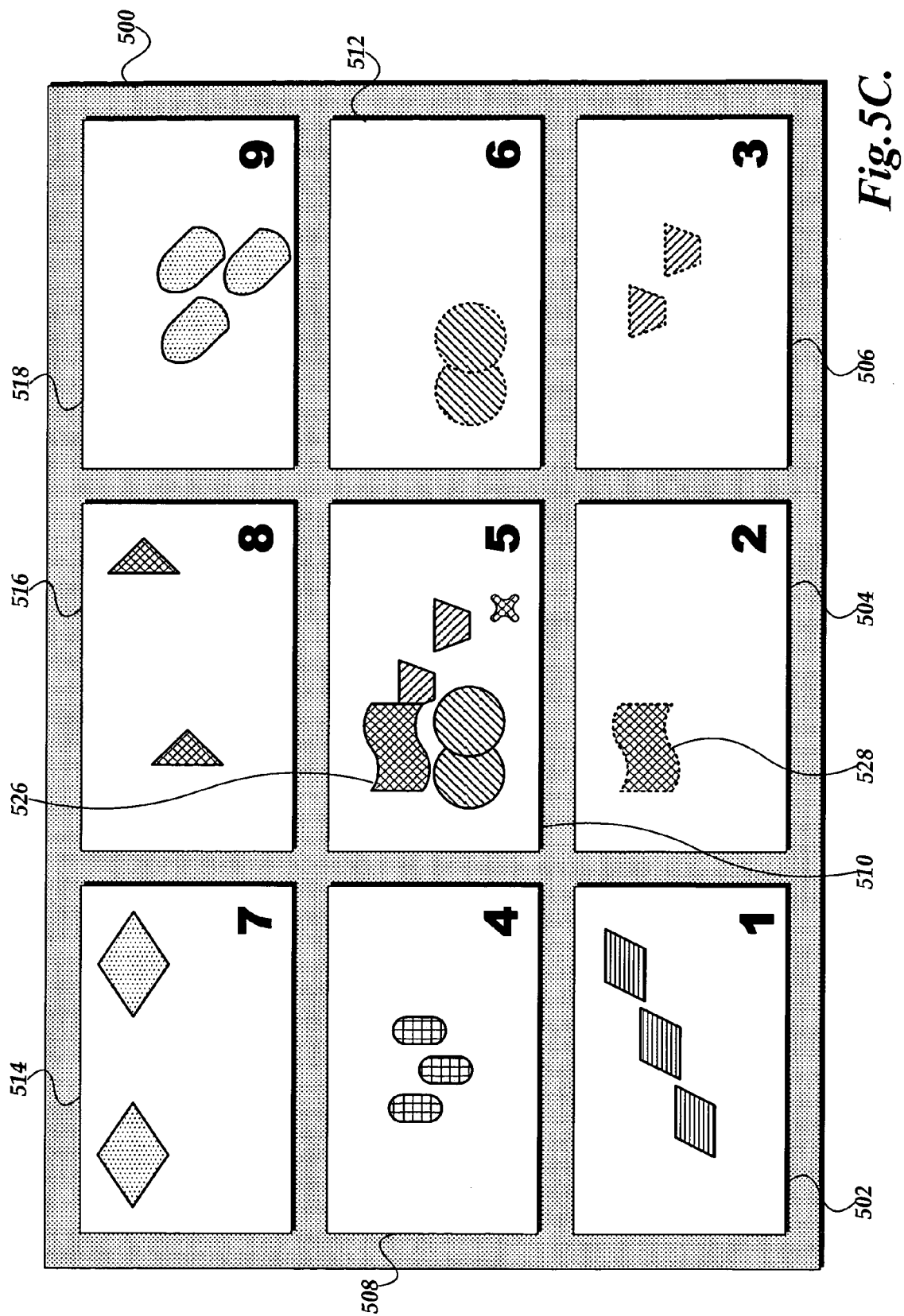

After having obtained the user's input identifying the target content group, at block 418, the content from the target content group is obtained. At block 420, the obtained content is combined with the content already in the working group 510. Furthering the example above, assuming that content group 504 was identified as the target content group, the exemplary routine 400 would obtain the content in the content group 504 and combine it with the other content already in the working group 510. FIG. 5C is a pictorial diagram illustrating the exemplary display area 500 after content 526 has been retrieved from the content group 504 into the working group 510. As can be seen, the target content group 504 is also updated to show the retrieved content 528 in dashed lines, visually indicating that the content 528 is temporarily displayed in the working group 510.

With reference again to FIG. 4B and the exemplary routine 400, after having retrieved content from the target content group into the working group 510, the exemplary routine returns again to block 404 (FIG. 4A) to obtain additional content management instructions from the user.

Figure 4D:
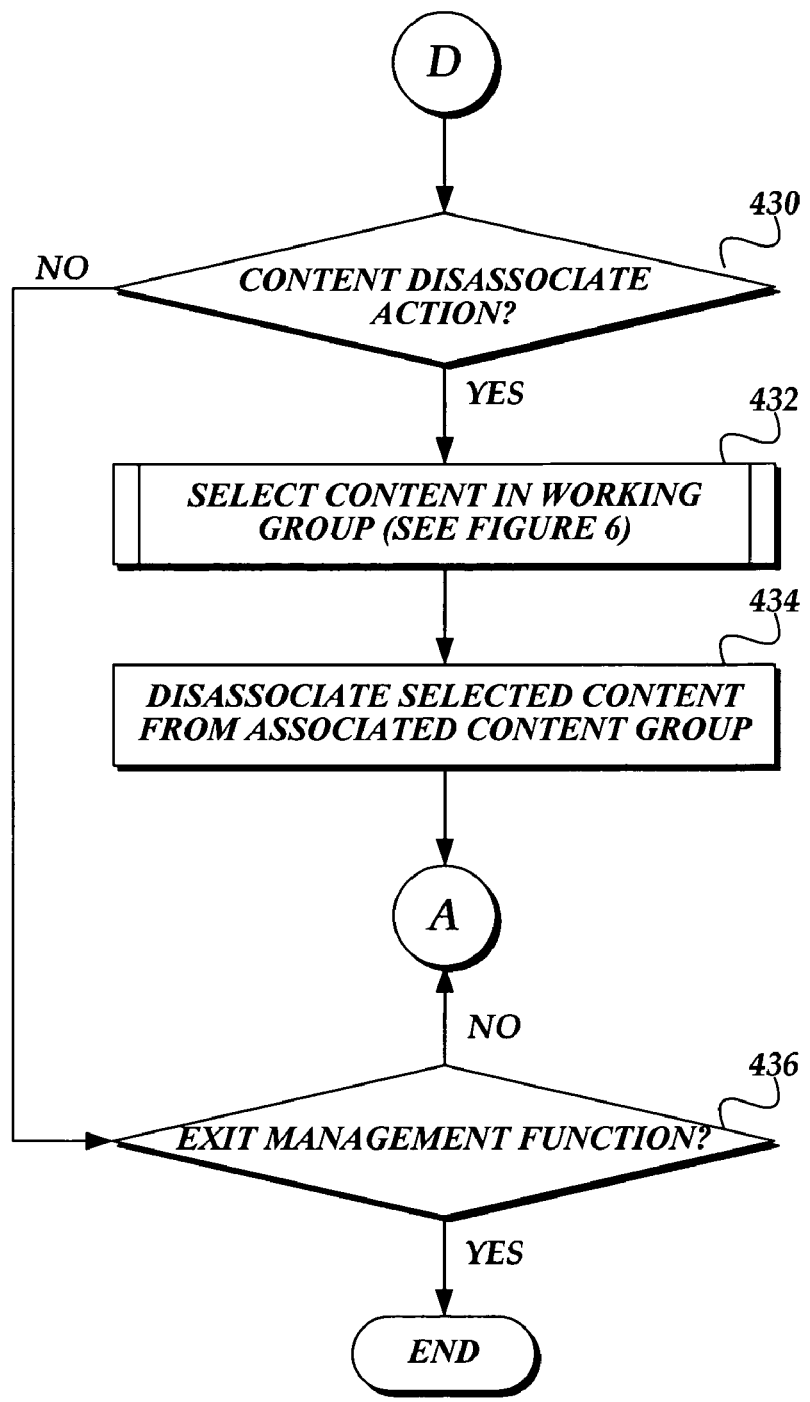

As indicated above, at decision block 414, if the user's input was not an instruction to retrieve content from a target content group into the working group 510, the exemplary routine proceeds to decision block 422 (FIG. 4C). At decision block 422, the exemplary routine 400 determines whether the user's input is an instruction to associate content currently in the working group 510 with a target content group. If not, the routine 400 proceeds to decision block 430 (FIG. 4D).

If, at decision block 422, the user's input is an instruction to associate content in the working group 510 with a target content group, the routine proceeds to block 424. At block 424, the user selects content in the working group 510 to be associated with a target content group. While selecting content displayed in the working group 510 can be performed in any number of ways, FIG. 6 sets forth an exemplary routine for selecting content.

Figure 6:
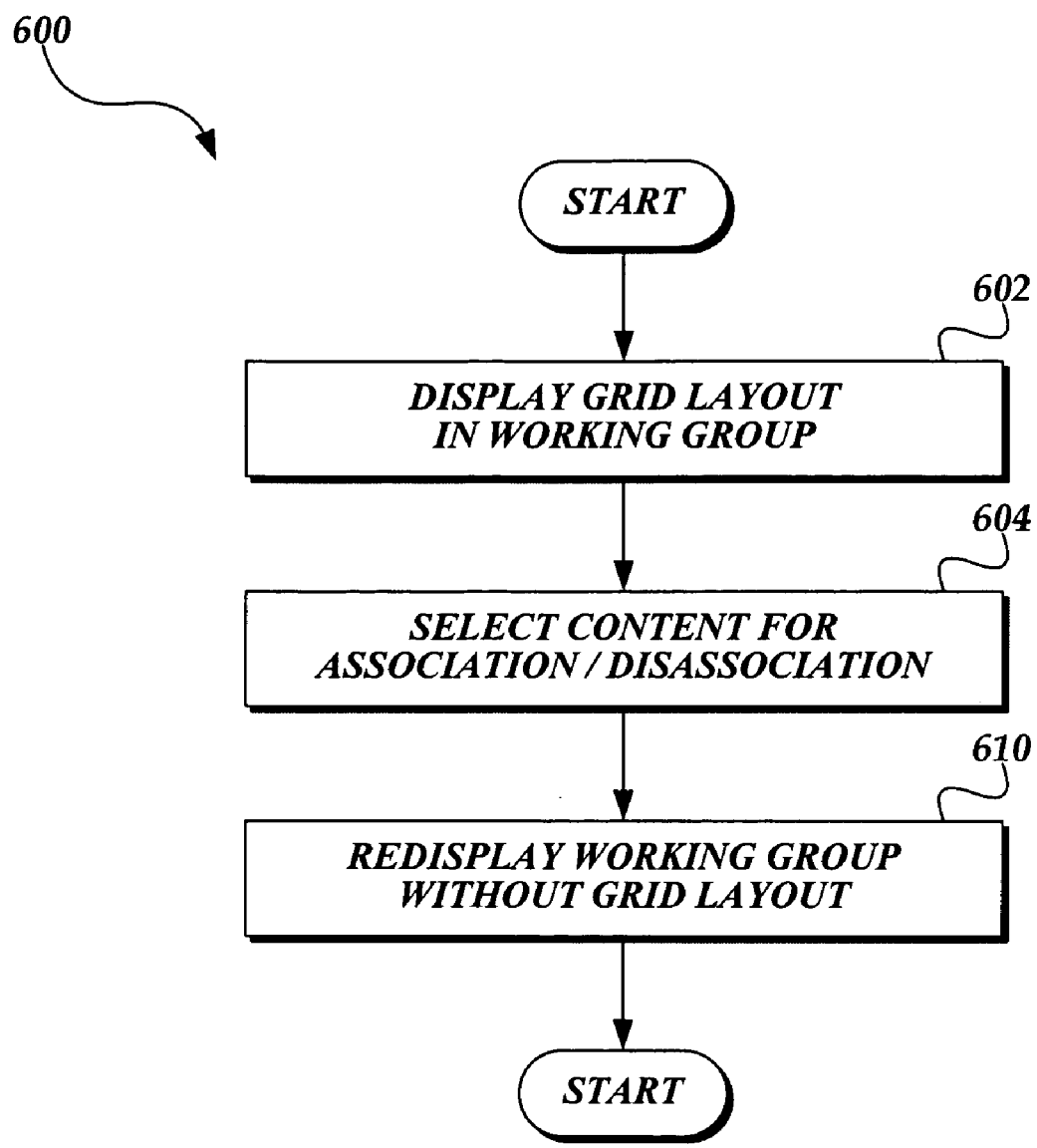
FIG. 6 is a flow diagram illustrating an exemplary routine 600 for selecting content displayed in the working group and suitable for use by the exemplary routine of FIGS. 4A-4C.

FIG. 6 is a flow diagram illustrating an exemplary routine 600 for selecting content displayed in the working group, suitable for use by the exemplary routine 400. Using the general principles set forth above in regard to using the arrangement of a numeric keypad to select targets for management actions, at block 602, the working group 510 is divided into sections in a grid layout and its contents are displayed to the user. As an example of displaying the contents of the working group 510 into sections in a grid layout, and furthering the example discussed above in regard to FIG. 5C, FIG. 7 illustrates the contents of the working group 510 as would be displayed to the user, divided into nine sections in a grid layout. Each section in the grid, including sections 702 and 704, corresponds to and is responsive to a number 1-9 on the numeric keypad 302. Additionally, each section in the grid displays a corresponding number that the user may press to select content in that section.

According to one embodiment of the present invention, only content that is currently unassociated with a content group, or is associated with the work group, can be associated to a content group. To facilitate the identification of content that can be associated with a target content group, in reference to FIG. 7, content that can be associated with a target content group is displayed with a solid border, such as content 520, while all other content is displayed with a dashed border. Of course, such visual indication is only one example of the many ways in which the system may indicate which content in the working group 510 can be associated with a target content group, and accordingly, should be viewed as illustrative only, and not construed as limiting upon the present invention.

In an alternative embodiment (not shown), any content in the working group 510 can be assigned (or in some cases, reassociated) to a target content group. Thus, any content that is already associated to one content group, could be reassigned to a target content group specified by the user.

By dividing the working group into sections in a grid, the user can easily select content for association to a target content group simply by pressing a key corresponding to the number displayed in a section. Content that spans more than one section is deemed included in the section where the center of the content's mass is located. Thus, while content 520 is found in both grid sections 702 and 704, selecting grid section 702, by the keypress <2>, would identify content 520 to be assigned to a target content group.

Returning again to FIG. 6, with the contents of the working group 510 displayed in a grid layout, at block 604, the user selects content for association with a target content group by pressing one or more keys corresponding to the numbers displayed in the sections. After selecting content to be associated with a content group, at block 606, the previously displayed screen (in this case the representative views) are redisplayed. Thereafter, the routine 600 terminates.

While routine 600 sets forth a general routine for selecting content, a more detailed description of selecting and navigating content is set forth in co-pending and commonly assigned patent applications entitled, A Single-Handed Approach For Navigation Of Application Tiles Using Zooming And Panning, U.S. patent application Ser. No. 11/061,218, filed Feb. 18, 2005, which is incorporated herein by reference, and Advanced Navigation Techniques For Portable Devices Key-Based Advanced Navigation Techniques, U.S. patent application Ser. No. 10/791,229, filed Mar. 4, 2004, which is also incorporated herein by reference. Furthermore, it should be appreciated that content may be selected using any number of user interface means, such as using the system generally described above, via mouse clicking, the use of arrow keys, or tabbing through the displayed content. Thus, the above routine 600 should be viewed as illustrative, and not construed as limiting upon the present invention.

With reference again to FIG. 4C, after having selected content for association to a target content group, at block 426, the system obtains the target content group number with which the selected content will be associated. At block 428, the selected content is associated with the identified target content group. Thereafter, the exemplary routine 400 returns again to block 404 to obtain additional user instructions/input as to content group management.

According to aspects of the present invention, when content is associated with a target content group, the associated content remains in the working group 510, as if it was automatically retrieved from the target content group. Alternatively, upon association, the associated content is removed from the working group 510, as if a stow action were performed on the selected content, and displayed in the target content group until a retrieve action is performed.

Figure 5D:
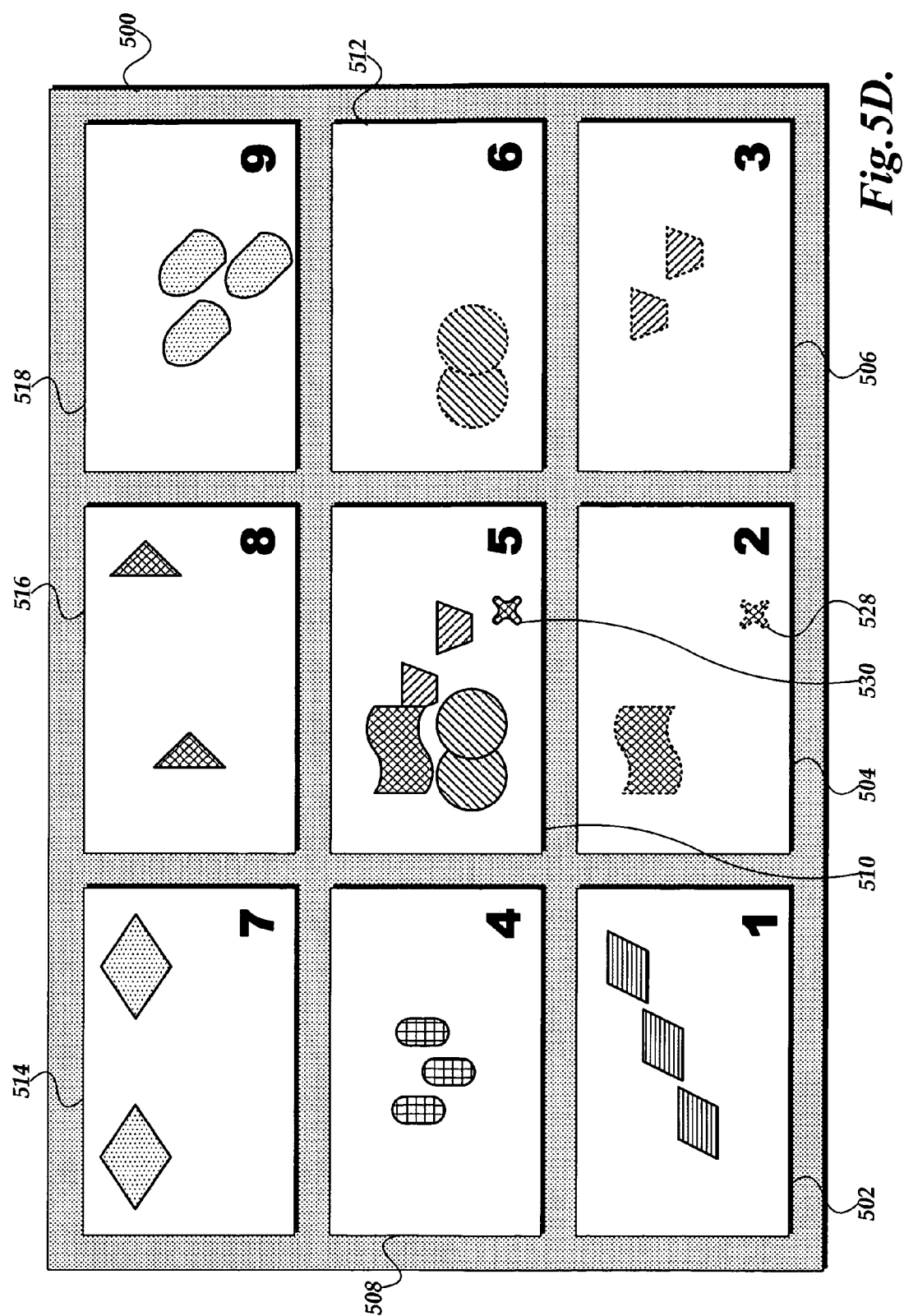
Figure 7:
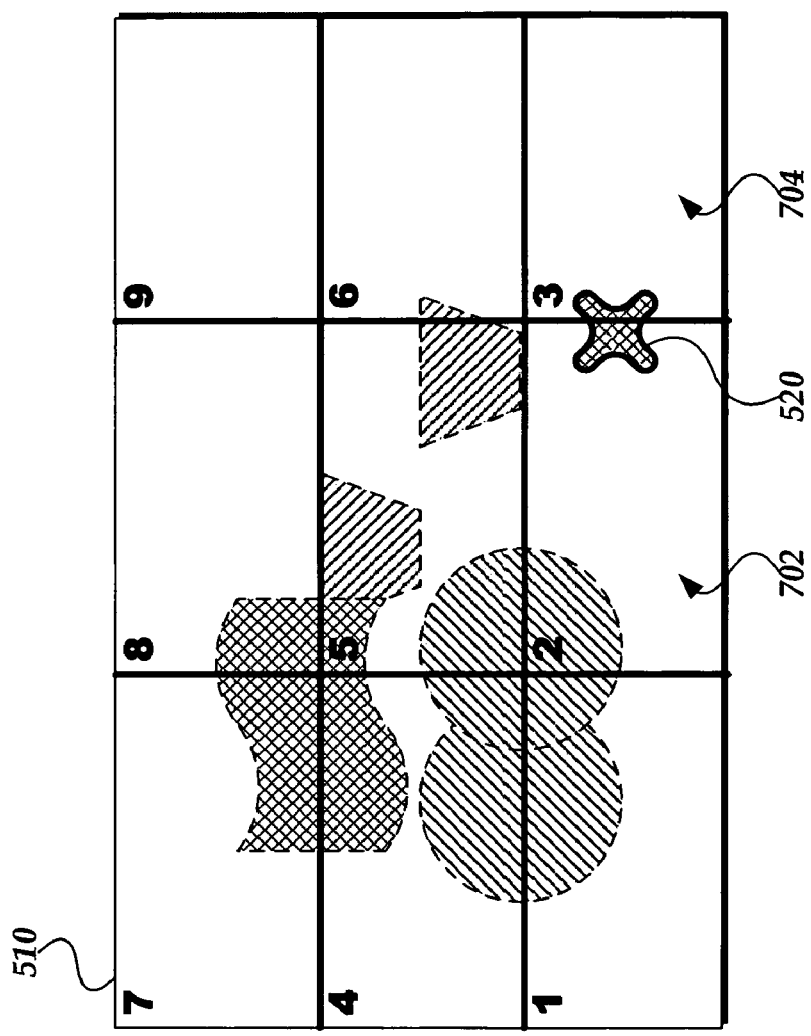
FIG. 7 is a pictorial diagram illustrating an exemplary working group subdivided into sections for selecting content for association with a content group.

With reference to FIG. 7, and FIGS. 5C and 5D, and continuing the example from above, assuming that the user selected content 520 to be associated with a target content group by pressing <2>, and then selected the target content group 504 by pressing <2> again, and further assuming that associated content 520 remains in the working group 510 until it is stowed in a stow action, FIG. 5D represents the results of the association action. In particular, as shown in FIG. 5D, content 520 remains in the working group 510, but is now correspondingly displayed (i.e., content 528) in the target content group 504, though content 528 is displayed in the target content group 504 in dashed lines, indicating that it is also currently active in the working group.

If, at decision block 422 (FIG. 4C), the user's input was not an instruction to associate content in the working group 510 with a target content group, the routine proceeds to decision block 430 (FIG. 4D). At decision block 430, a determination is made as to whether the user's input is an instruction to disassociate selected content from its currently associated content group. If the user's input is not an instruction to disassociate selected content from its currently associated content group, the routine 400 proceeds to decision block 438, discussed below.

If the user's input is an instruction to disassociate content from its currently associated content group, at block 434 the user selects content from the working group which is to be disassociated from its currently associated content group. Selecting content in the working group has been described above in regard to FIG. 6. Once the user has selected content to be disassociated from its current content group, at block 436, the selected content is disassociated from its target content group. Thereafter, the routine 400 returns again to block 404 to obtain additional user input.

Continuing the example from above, and assuming that the user selected content 526 and 520 to be disassociated from its target content group 504, FIG. 5E illustrates the results of the disassociation. In particular, content 526 and 520 are no longer displayed in representative view 504. Additionally, content 526 and 520 are displayed in the working group 510 with solid borders, visually indicating that they do not have an associated content group other than the working group. Thereafter, the exemplary routine 800 terminates.

With regard to FIG. 4D, if the user's input was not an instruction to disassociate selected content from its currently associated content group, the routine 400 proceeds to decision block 438, where a determination is made as to whether the user indicated that the content group management system should be exited. If the content group management system is to be exited, the exemplary routine 400 terminates. Alternatively, allowing for additional content group management functions not described above, the routine 400 returns to block 404 to await additional user instructions.

While various content group management functions have been described, it should be appreciated that other management functions may also be implemented using the keypress system, as described above. For example, a swap function may be implemented, wherein the current contents of the working group are stowed and the contents of a target content group are retrieved into the working group. Of course, those skilled in the art will appreciate that a swap can be accomplished using a combination of stow and retrieve functions, but it may be desirable to provide the swap function as a single step action similar to stow and retrieve.

As indicated above, the exemplary routine 400 may remain in a type of content group management mode until directed to exit by a user. Alternatively, according to another embodiment, after each content group management action is successfully completed, the content group management mode is exited upon completing the function indicated by the user.

Figure 8:
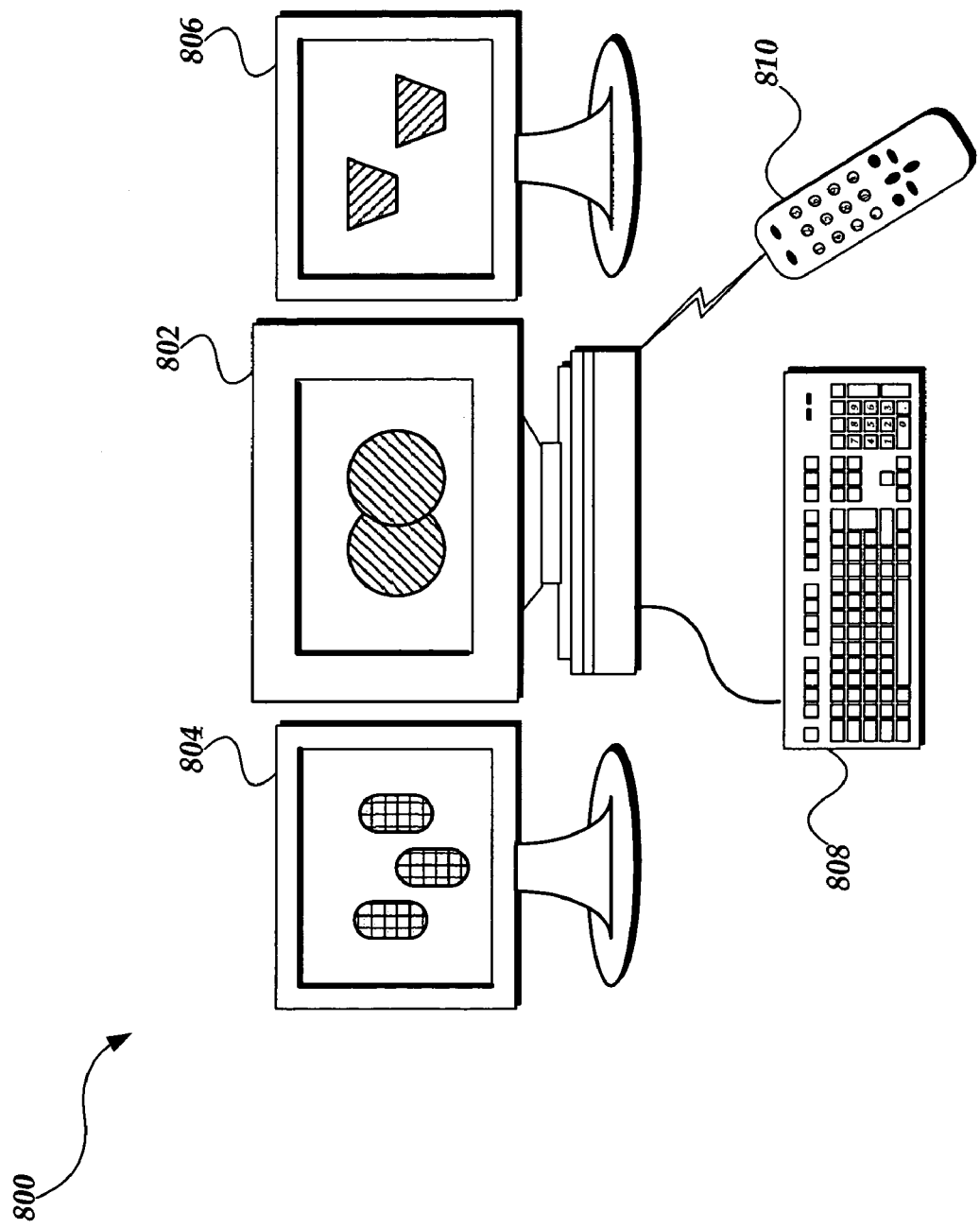
FIG. 8 is a pictorial diagram illustrating an exemplary multi-monitor computer system suitable for implementing aspects of the present invention.

While the present invention has been described in regard to a single monitor computer system 100, the present invention is similarly useful when applied to a multi-monitor computer system. FIG. 8 is a pictorial diagram illustrating an exemplary multi-monitor computer system 800, which includes a primary monitor 802 and two additional monitors, monitors 804 and 806. The exemplary multi-monitor computer system 800 also illustrates an exemplary keyboard 808 that includes a numeric keypad, and a remote control device 810 that also includes a numeric keypad.

In a multi-monitor computer system, the content displayed on all monitors may be viewed as a single working group, or alternatively, as a working group with other additionally displayed content groups. In other words, the content displayed by monitors 802-806 may be viewed as the working group, or alternatively, as three separate content groups including a working group.

FIG. 9 is a pictorial diagram illustrating an exemplary set of content groups 900 defined for the computer system 800 where the content displayed on the monitors in the multi-monitor computer system is viewed as a single working group 902. In the exemplary content groups 900, each content group, such as working group 902, indicates the partitions between monitors. However, this is for illustration only, and may or may not be displayed in an actual embodiment.

As shown in FIG. 9, the contents currently displayed in the working group 902 are actually associated with content from content groups 904 and 906. In particular, the content displayed in the working group 902, and as shown on the exemplary multi-monitor computer system 800 (FIG. 8), is actually a combination of content 908 temporarily retrieved from content group 906, and content 910 temporarily retrieved into the working group 902 from content group 904. This combination clearly illustrates one advantage of the present invention over virtual desktops: the ability to associate and display content from more than one content group through a working group 902.

Figure 10:
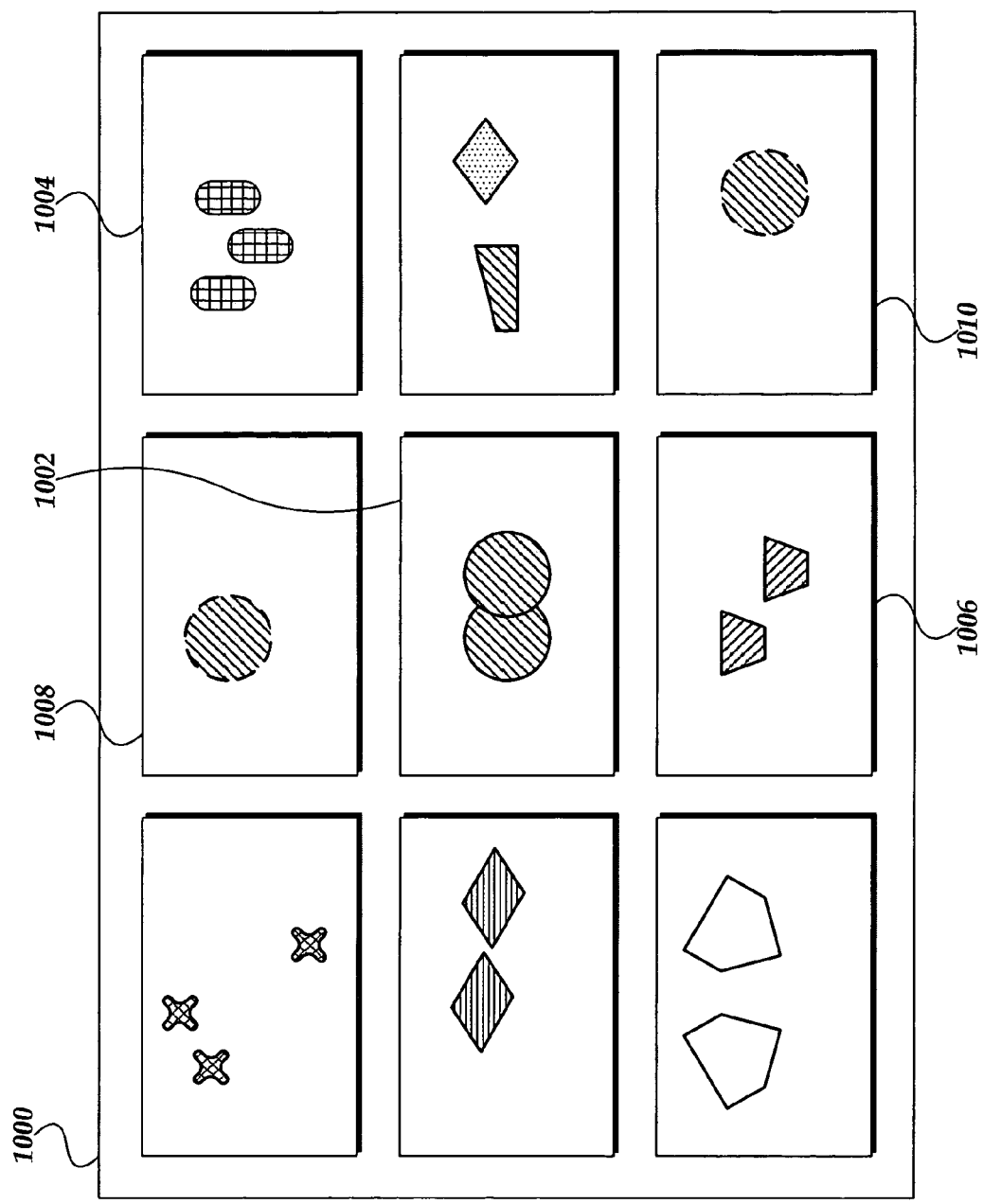
FIG. 10 is a pictorial diagram illustrating exemplary content groups and illustrates the embodiment where the contents of one monitor is viewed as the working group, and the additional monitors display other content groups.

FIG. 10 is a pictorial diagram illustrating exemplary content groups 1000 where the contents displayed on each monitor in the multi-monitor computer system 800 constitutes a single content group. For example, the content displayed on monitor 802 is displayed in the working group 1002, and the contents of monitors 804 and 806 are displayed as content groups 1004 and 1006, respectively.

Additionally, while each monitor of the multi-monitor computer system 800 constitutes a single content group, FIG. 10 still illustrates that content from multiple content groups can be associated with and displayed in a single working group 1002. In particular, as can be seen in FIG. 10, the content displayed in working group 1002 includes content temporarily retrieved from content groups 1008 and 1010.

Figure 11:
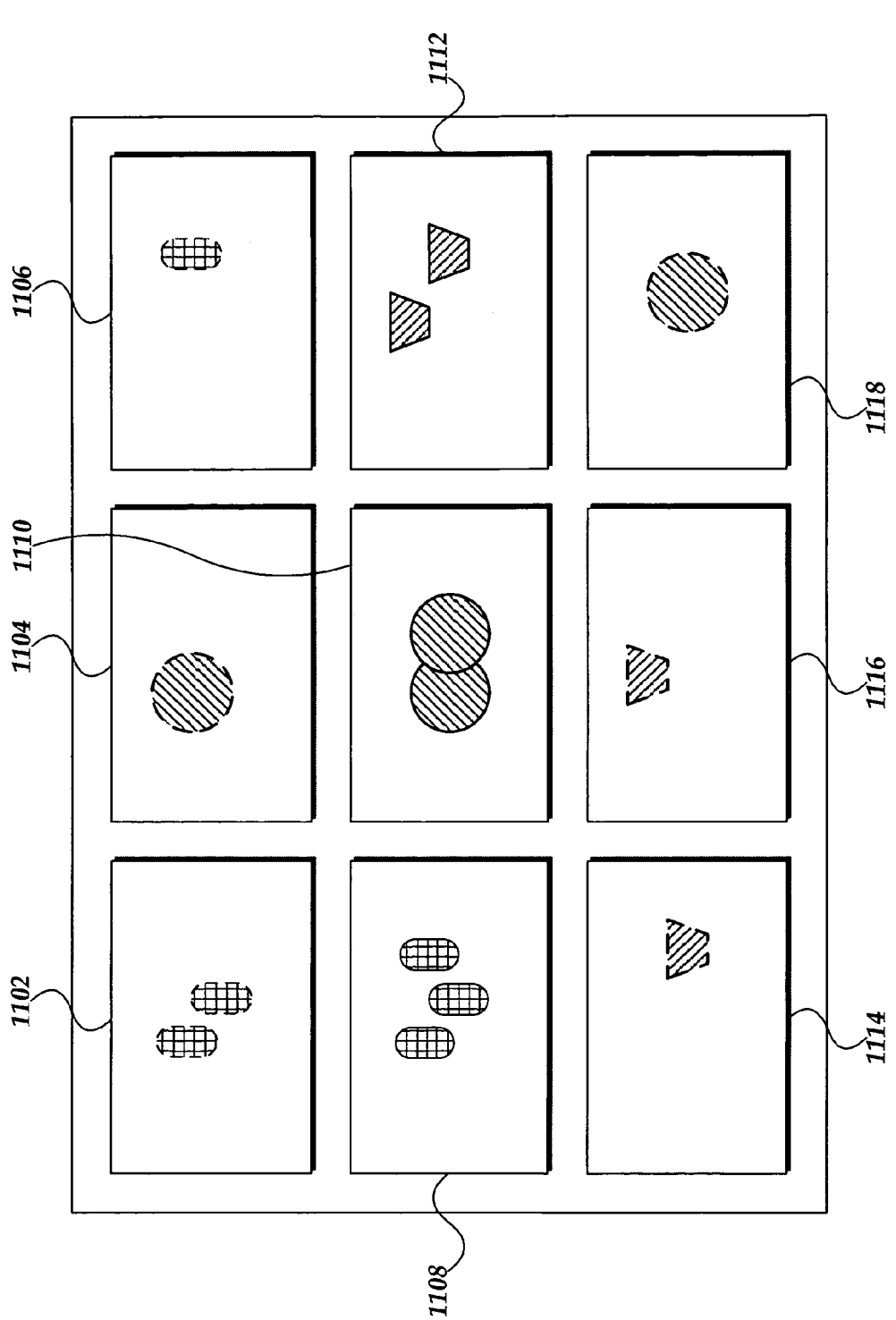
FIG. 11 is a pictorial diagram illustrating the ability to associate and display content from multiple content through a plurality of working groups.

While the above discussion has described just one working group on a computer system, the present invention is not so limited. FIG. 11 is a pictorial diagram illustrating the ability to associate and display content from multiple content through a plurality of working groups, particularly working groups 1108, 1110, and 1112. As can be seen in FIG. 11, content from content groups 1102 and 1106 are temporarily retrieved into and displayed in working group 1108; content from content groups 1104 and 1118 temporarily retrieved into and displayed in working group 1110; and content from content groups 1114 and 1116 temporarily retrieved into and displayed in working group 1112.

With regard to a multi-monitor system, such as system 800 (FIG. 8), by using the present invention, a user can freely associate any content that is currently displayed on any display device/monitor with a target content group. Moreover, this ability to associate displayed content with a target content group may be made using a numeric keypad, a remote control having a numeric keypad, or a wireless telephone (which also includes a numeric keypad.) Furthermore, for both single monitor systems and multi-monitor systems, by arranging predefined content groups in the general arrangement of a numeric keypad, and associating corresponding numbers with the content groups, a user can associate, disassociate, stow, and retrieve content to and from content groups without the use of a mouse or other interactive pointing device. When using a keyboard, such as keyboard 300 (FIG. 3), a user need not switch from typing on the keyboard to a mouse or other pointing device to manage the display of content through content groups. Instead, that user can keep both hands on the keyboard 300, which is frequently viewed as a great savings in efficiency.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A display management system, operating on a computer system having a display device, a memory, a graphics display system, and an input device having a plurality of keys for inputting data to the computer system, for efficiently managing displayable content on the computer system, wherein the display management system is configured such that:

the display management system defines a plurality of content groups;

groups of display content are associated with one of a plurality of content groups;

one of the plurality of content groups is defined as a working group;

upon detecting a display management trigger event, the display management system:

displays a plurality of representative views on the display on the display device in a grid arrangement, wherein each representative view corresponds to a particular content group, comprises all display content associated with the particular content group and wherein each representative view is associated with a key on the input device;

in an event a particular display content is disassociated from all content groups: the particular display content is associated with the working group by default;

in an event a particular display content associated with a particular content group other than the working group and the display content is retrieved into the working group:

the particular display content is displayed simultaneously using the working group and the content group, the particular display content represented in a modified format, the modified format comprising one or more modifications selected from a list, the list comprising:

a dashed border; and a grayed out appearance;

obtains a display management action event identifying a management action to be taken by the content management system;

obtains a keypress input from the input device;

identifies a content group corresponding to the keypress input; and carries out the identified management action on the identified content group using the working group.

2. The display management system of claim 1, wherein the display management system displays a value in each representative view that corresponds to the key on the input device that is associated with the representative view.

3. The display management system of claim 1, wherein the display management system defines nine content groups, and wherein the grid arrangement of the representative views corresponds to the key arrangement of keys 1-9 on a numeric keypad.

4. The display management system of claim 1, wherein the display management action event is obtained as a result of a single key or combination of a typical key keypress, a function key keypress, a typical key keypress and a modifier key keypress, or a function key keypress and a modifier key keypress.

5. The display management system of claim 1, wherein the management action to be taken by the content management system removes content associated with the identified content group.

6. The display management system of claim 1, wherein the management action to be taken by the content management system retrieves content associated with the identified content group; and
temporarily displays the content using the working group.

7. The display management system of claim 1, wherein the management action to be taken by the content management system removes content associated with a particular first content from the working group representation; and
retrieves a particular second content to be displayed using the working group.

8. The display management system of claim 1, wherein the management action to be taken by the content management system is associates a particular identified content currently displayed in the working group with a particular content group.

9. The display management system of claim 1, wherein the management action to be taken by the content management system disassociates a particular content currently displayed using the working group from the content group with which the particular content was associated.

10. A computer-readable storage medium storing computer-executable instructions which, when executed on a computer including a display device, a graphics display system, a memory, and an input device having a plurality of keys for inputting data into the computer, carry out a method for efficiently managing display content on the computer, the method comprising:
defining a plurality of content groups, wherein a content group in the plurality of content groups is a grouping of content that can be displayed on the display device via the graphics display system, and wherein one of the content groups is designated as a working group through which a management action on content within each of the plurality of content groups is effectuated; and
upon detecting a display management trigger event:
displaying a plurality of representative views on the display device, wherein each representative view corresponds to a content group, and wherein each representative view is associated with a key on the input device;
in an event a particular display content is disassociated from all content groups: the particular display content is associated with the working group by default;
in an event a particular display content associated with a particular content group other than the working group and the display content is retrieved into the working group:
the particular display content is displayed simultaneously using the working group and the content group, the particular display content represented in a modified format, the modified format comprising one or more modifications selected from a list, the list comprising:
a dashed border; and
a grayed out appearance;
obtaining a display management action event identifying a management action to be taken by the content management system;
obtaining a keypress input from the input device;
identifying a content group corresponding to the keypress input by identifying the representative view associated to the key of the keypress input, and identifying the content group corresponding to the identified representative view; and
implementing the identified management action on the identified content group using the working group.

11. The computer-readable storage medium of claim 10 further comprising displaying a value in each representative view that corresponds to the key on the input device that is associated with the representative view.

12. The computer-readable storage medium of claim 11, wherein defining the plurality of content groups comprises defining nine content groups, and wherein the plurality of representative views are displayed on the display device in a grid arrangement corresponding to the key arrangement of keys 1-9 on a numeric keypad.

13. The computer-readable storage medium of claim 12, wherein display content can be associated with a defined content group, and display content associated with a content group other than the working group can only be temporarily displayed using the working group.

14. The computer-readable storage medium of claim 13, wherein the display management action event is obtained as a result of a single keypress combination of a typical key keypress, a function key keypress, a typical key keypress and a modifier key keypress, or a function key keypress and a modifier key keypress.

15. A computer system for efficiently managing the display of content to a computer user, the computer system comprising:
a display device for displaying content to the computer user;
an input device having a plurality of keys for inputting data into the computer system;
a memory storing a plurality of content groups defined on the computer system, each content group in the plurality of content groups comprising a group of displayable content, and wherein one of the content groups is designated as a working group through which a content group management action on displayable content within each of the plurality of content groups is effectuated; and
a graphics display system configured to render displayable content onto the display device;
wherein the computer system is configured to detect a content management event, and upon detecting the content management event, the computer system:
displays a plurality of representative views in a grid arrangement, wherein each representative view corresponds to a defined content group, wherein each representative view also corresponds to one of the keys on the input device and further displays the value of the corresponding key on the representative view, and wherein the grid arrangement corresponds to the arrangement of keys on the input device;

in an event a particular display content is disassociated from all content groups: the particular display content is associated with the working group by default;

in an event a particular display content associated with a particular content group other than the working group and the display content is retrieved into the working group:

the particular display content is displayed simultaneously using the working group and the content group. the particular display content represented in a modified format, the modified format comprising one or more modifications selected from a list, the list comprising:

a dashed border; and a grayed out appearance;

obtains a management action event identifying a content group management action to be taken by the computer system;

obtains a key input from the input device that identifies a content group upon which the content group management action is to be taken; and carries out the content group management action on the identified content group using the working group.

\* \* \* \* \*

UNITED STATES PATENT AND TRADEMARK OFFICE
CERTIFICATE OF CORRECTION

| | | |
|---|---|---|
| PATENT NO. | : 7,624,354 B2 | Page 1 of 1 |
| APPLICATION NO. | : 11/119395 | |
| DATED | : November 24, 2009 | |
| INVENTOR(S) | : Mary P. Czerwinski et al. | |

It is certified that error appears in the above-identified patent and that said Letters Patent is hereby corrected as shown below:

In column 15, line 14, in Claim 15, delete "group." and insert -- group, --, therefor.

Signed and Sealed this
Tenth Day of May, 2011

David J. Kappos
*Director of the United States Patent and Trademark Office*